(12) United States Patent
Chu et al.

(10) Patent No.: US 11,720,455 B2
(45) Date of Patent: Aug. 8, 2023

(54) METHOD, APPARATUS, AND NON-TRANSITORY COMPUTER READABLE MEDIUM FOR MIGRATING VIRTUAL MACHINES

(71) Applicant: Fulian Precision Electronics (Tianjin) Co., LTD., Tianjin (CN)

(72) Inventors: Yu-Sheng Chu, Taipei (TW); Yi-Feng Chen, Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 0 days.

(21) Appl. No.: 17/554,520

(22) Filed: Dec. 17, 2021

(65) Prior Publication Data
US 2023/0062733 A1    Mar. 2, 2023

(30) Foreign Application Priority Data
Aug. 25, 2021    (CN) .......................... 202110984354.4

(51) Int. Cl.
*G06F 11/20* (2006.01)
*G06F 11/34* (2006.01)
*G06F 11/07* (2006.01)

(52) U.S. Cl.
CPC ........ *G06F 11/203* (2013.01); *G06F 11/0712* (2013.01); *G06F 11/2041* (2013.01); *G06F 11/3419* (2013.01)

(58) Field of Classification Search
CPC ............... G06F 11/203; G06F 11/0712; G06F 11/2041; G06F 11/3419
See application file for complete search history.

(56) References Cited

U.S. PATENT DOCUMENTS

| | | | | |
|---|---|---|---|---|
| 10,230,785 B1* | 3/2019 | Gadalin | .............. | H04L 67/1095 |
| 10,810,037 B1* | 10/2020 | Liu | ................... | G06F 9/45558 |
| 11,169,835 B1* | 11/2021 | Duong | ................ | G06F 9/4856 |
| 2015/0143364 A1* | 5/2015 | Anderson | ............. | G06F 9/5016 |
| | | | | 718/1 |
| 2015/0237132 A1* | 8/2015 | Antony | ................... | H04L 67/10 |
| | | | | 709/224 |
| 2016/0378546 A1* | 12/2016 | Brouwer | ............... | G06F 9/4856 |
| | | | | 718/1 |
| 2018/0359728 A1* | 12/2018 | Abedini | ................. | H04W 72/04 |
| 2020/0112497 A1* | 4/2020 | Yenumulapalli | ........ | H04L 43/10 |
| 2021/0103870 A1* | 4/2021 | Hayashi | .............. | H04L 41/0897 |
| 2021/0111988 A1* | 4/2021 | Plate | ....................... | H04L 45/08 |
| 2022/0138177 A1* | 5/2022 | Raju | .................... | G06F 11/2094 |
| | | | | 707/703 |

FOREIGN PATENT DOCUMENTS

| CN | 110908832 A | 3/2020 |
|---|---|---|
| CN | 111399978 A | 7/2020 |

* cited by examiner

*Primary Examiner* — Loan L. T. Truong
*Assistant Examiner* — Matthew N Putaraksa
(74) *Attorney, Agent, or Firm* — ScienBiziP, P.C.

(57) ABSTRACT

A method and an apparatus for migrating virtual machine includes monitoring a status of a compute node; determining whether the compute node meets a trigger condition; wherein the trigger condition comprising a time period of lost connection of the compute node reaches a predetermined time period, or an unstable status of the compute node; and if the compute node meets the trigger condition, transmitting a message to a control node to migrate the VM.

17 Claims, 5 Drawing Sheets

METHOD, APPARATUS, AND NON-TRANSITORY COMPUTER READABLE MEDIUM FOR MIGRATING VIRTUAL MACHINES

CROSS-REFERENCE TO RELATED APPLICATIONS

This application claims priority to China Patent Application No. 202110984354.4 filed on Aug. 25, 2021, filed in China National Intellectual Property Administration, the contents of which are incorporated by reference herein.

FIELD

The subject matter herein generally relates to cloud computing technology, and particularly to a method, an apparatus, and a non-transitory computer readable medium for migrating virtual machines.

BACKGROUND

Traditionally, managing cloud platform may use a system for monitoring physical nodes, and such a system needs operators for managing the running and services. When one of the physical nodes is abnormal or malfunctioning, the service of this physical node in hosting a virtual machine (VM) needs to be migrated to other physical nodes manually by the operator. However, the manual operation may cause delay, particularly in emergency situations, which may affect an efficiency of the transfer.

For instance, in the Openstack cloud platform, when one of compute nodes is abnormal causing the compute node to shut down or reboot, or when one of compute nodes is affecting the running of the Openstack cloud platform, migrating a VM of the compute node to other unoccupied compute nodes is needed. When the operator finds abnormality of the Openstack cloud platform, the operator must determine whether to migrate the VM by monitoring data, and migrate the VM to other compute nodes through an evacuate instruction of a Nova module in the Openstack cloud platform. However, using the evacuate instruction for migrating the VM requires the operator to input instruction manually or to invoke an application programming interface (API), which may generate a time delay. Extra time for recovering the VM is then needed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
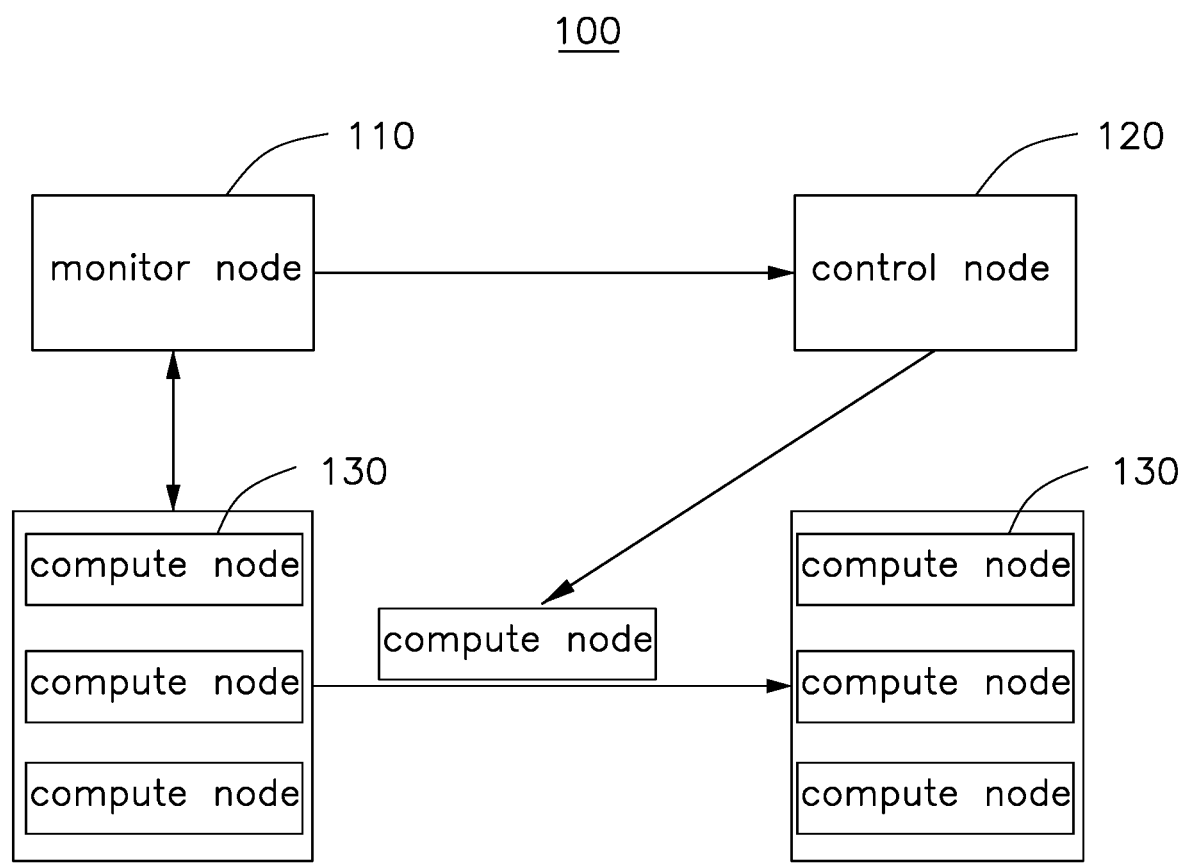
FIG. 1 illustrates a schematic view of at least one embodiment of a system for managing a cloud platform according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; in detail, it indicates open-ended inclusion or membership in a so-described combination, group, series, and the like.

Physical nodes may include a monitor node 110, a control node 120, and a compute node 130. The physical nodes may be personal computers, tablet computers, laptop computers, smart phones, personal digital assistants (PDAs), routers, work stations, servers, etc.

FIG. 1 illustrates a schematic view of at least one embodiment of a system 100 for managing a cloud platform. The system 100 includes a monitor node 110, a control node 120, and a compute node 130. The monitor node 110 is in communication with the control node 120 and the compute node 130. The control node 120 is in communication with the compute node 130.

In at least one embodiment, the connection for communication includes wired or wireless connections. The wired connection means a connection through wired transmission medium (such as optical fiber or twisted-pair). The wireless connection means a connection through wireless transmission medium (such as WI-FI, BLUETOOTH, NFC, or wireless communication network such as 2G/3G/4G/5G).

The compute node 130 is configured to run one or more virtual machines (VMs).

The control node 120 is configured to control one or more compute node 130, and migrate the VM of a compute node 130 to another compute node 130.

The monitor node 110 is configured to monitor a status of the compute node 130, to determine whether the compute node 130 is abnormal in operation. When the compute node 130 is abnormal, the monitor node 110 transmits a message to the control node 120, so as to migrate the VM of the abnormal compute node 130 to other available compute nodes 130.

In at least one embodiment, the monitor node 110 determines whether the compute node 130 is abnormal in operation by activating a trigger condition. When the status of the compute node 130 is such as to activate the trigger condition, the monitor node 110 determines that the compute node 130 is abnormal in operation, and transmits a message to the control node 120, so as to migrate the VM. Until the compute node 130 meets the trigger condition, the monitor node 110 determines that the compute node 130 is working normally, and continuously monitors the status of the compute node 130.

In at least one embodiment, the trigger condition includes a time period of lost connection of the compute node 130 reaches a predetermined time period, or an unstable status of the compute node 130. The predetermined time period may be in a range of about 1 min-5 min, such as being 2 minutes.

The lost connection of the compute node 130 includes four conditions: a lost connection of nova-compute agency services, a quantity of the nova-compute agency services being in lost connection status is 1, a lost connection of a 10G network, and a lost connection of a 1G network. The 10G network indicates a network between the control node 120 and the compute node 130, the VM is migrated in the 10G network. The 1G network indicates a network between the monitor node 110 and the compute node 130, the monitor signal is transmitted in the 1G network. The nova-compute agency service may provide an access point for managing and configuring the VM. The nova-compute agency service may be run on the compute node 130 and configured to manage an instance of the compute node 130. When meeting the four conditions, the connection of the compute node 130 is determined as lost.

The unstable status of the compute node 130 includes four conditions: a lost connection of the nova-compute agency services, a quantity of the nova-compute agency services being in lost connection status is 1, a lost connection of the 10G network, and a quantity of the 10G networks in lost connection status is 1. When the quantity of the nova-compute agency services in lost connection status is 1, a frequency of the lost connection of the nova-compute agency services reaches a first determined frequency, the quantity of the 10G networks being in lost connection status is 1, and a frequency of the lost connection of the 10G networks reaches a second determined frequency, the unstable status of the compute node 130 is determined. The first determined frequency may be in a range of about 8/10 min-14/10 min, such as the first determined frequency being 14/10 min. The second determined frequency may be in a range of about 4/10 min-7/10 min, such as the second determined frequency being 7/10 min.

In the 10G network, the nova-compute agency service transmits a data packet every 30 seconds when working normally, to manage the instance of the compute node 130. During a time period of 10 minutes, the nova-compute agency service transmits 20 data packets. When a packet loss probability of the data packets reaches 40%-70%, that is, when the first determined frequency is 8/10 min-14/10 min, determining that the unstable status of the nova-compute agency service. The compute node 130 transmits a data packet every 60 seconds when working normally, to lessen the effect of by broadcast storm. During the time period of 10 minutes, the compute node 130 transmits 10 data packets. When the packet loss probability of the data packets reaches 40%-70%, that is, when the second determined frequency is 4/10 min-7/10 min, determining that the unstable status of the compute node 130. When both the unstable status of the nova-compute agency service and the unstable status of the compute node 130 are determined, the monitor node 110 determines that the compute node 130 is abnormal in operation and transmits the message to the control node 120 to migrate the VM.

In at least one embodiment, when the monitor node 110 determines the compute node 130 is abnormal, the VMs of the abnormal compute node 130 are migrated in order, to avoid a migration from one abnormal compute node 130 to another abnormal compute node 130.

For instance, when the monitor node 110 determines that both a first compute node 130 and a second compute node 130 are abnormal, the monitor node 110 transmits a first message to the control node 120, to migrate the VM of the first compute node 130. After the migration of the VM of the first compute node 130 is finished, the monitor node 110 transmits a second message to the control node 120, to migrate the VM of the second compute node 130.

In at least one embodiment, the monitor node 110 may switch to an insurance status to stop the migration of VMs of other compute nodes 130.

For instance, when the monitor node 110 determines that several compute nodes 130 are abnormal in operation, the monitor node 110 transmits a message to the control node 120, so as to migrate the VM. The control node 120 searches for unoccupied compute nodes 130, and orderly migrates the VMs of the abnormal compute nodes 130. When the control node 120 starts to migrate one of the VM of the abnormal compute nodes 130, the monitor node 110 switches to the insurance status to stop migration of the VMs of other abnormal compute nodes 130. After finishing the migration of one of the VMs of the abnormal compute nodes 130, the monitor node 110 switches to the working status to continuously monitor the status of the compute nodes 130.

In at least one embodiment, when the monitor node 110 transmits the message to the control node 120, the monitor node 110 examines a thread flag and a status lock of the control node 120, to avoid a thread re-entry. The thread flag is configured to indicate a migrating program of whether the control node 120 is running the VM. The status lock indicates whether the control node 120 is in a lock status.

For instance, when the thread flag=1, indicating that a migrating program of the control node 120 is running the VM, the control node 120 feeds back a status message to the monitor node 110 to stop new migrating programs, and wait for the finish and vacation of the present migrating program. When the thread flag=0, this indicates that the control node 120 is unoccupied, and the control node 120 feeds back a status message to the monitor node 110 to start the migrating program. When the status lock=1, this indicates that the control node 120 is locked, the control node 120 stops working and does not respond to the message of the monitor node 110. When the status lock=0, indicating that the control node 120 is unlocked, the control node 120 restarts working and responds to the message of the monitor node 110.

In at least one embodiment, when the control node 120 migrates the VM, the control node 120 examines a status of the system 100 for managing a cloud platform.

In detail, the control node 120 examines whether any unoccupied compute node 130 exists, examines a status of the nova service and a power source, and records a status of the VM of the abnormal compute node 130.

The system 100 divides a storage area of the compute nodes 130 into an unoccupied area and a working area according to the working status of the compute nodes 130. When no compute node 130 exists in the unoccupied area, meaning there is no unoccupied compute node 130, the control node 120 feeds back a status message of the compute node 130 to the monitor node 110 to stop the migrating program. When compute node 130 exists in the unoccupied area, meaning there is an unoccupied compute node 130, the control node 120 feeds back a status message of the compute node 130 to the monitor node 110 to start the migrating program.

The nova service is configured to maintain and manage the calculation of resources. The status of the nova service includes a normal status and an abnormal status. When the nova service is in the normal status, the control node 120 feeds back the status of the nova service to the monitor node 110 to start the migrating program. When the nova service is in the abnormal status, the control node 120 feeds back the status of the nova service to the monitor node 110 to stop the migrating program.

The control node 120 examines the status of the power source through a Baseboard Management Controller (BMC). The BMC may upgrade firmware and examining machine apparatus in a shutdown status. The status of the power source includes power-on, power-off, or standby. When the power source in the power-on status, the control node 120 feeds back the status of the power source to the monitor node 110 to start the migrating program. When the power source in the power-off status or the standby status, and the system 100 lost connection, the monitor node 110 may not receive the feedback message from the control node 120.

The control node 120 records the status of the VMs of the compute nodes 130. The status of the VM includes an active status or an error status. After VM migration, the control node 120 examines whether the status of the VM is corresponding to that before migration, so as to determine whether operating a repair program to the VM, and feeds back the message of the VM to the monitor node 110. When the status of the VM is not corresponding to that before migration, and if after a time period or a restart of the VM, but the status of the VM is still not corresponding to that before migration, the control node 120 runs the repair program to repair the VM. When the status of the VM is corresponding to that before migration, the control node 120 feeds back a message of successfully migrating the VM to the monitor node 110.

For instance, the VM is in the active status before migration and is in the error status after migration, if the VM recovers to the active status in 5 minutes or after a restart, the compute node 130 feeds back the message of successfully migrating the VM to the control node 120. The control node 120 feeds back the message of successfully migrating the VM to the monitor node 110. The control node 120 may run a restart program to restart the VM. If the VM is still in the error status in 5 minutes or after a restart, the compute node 130 feeds back the message of migration failure of the VM to the control node 120. The control node 120 feeds back the message of migration failure of the VM to the monitor node 110, and runs the repair program to repair the VM.

In at least one embodiment, after migrating the VM, the monitor node 110 displays a migrating time of the VM through a display. The migrating time of the VM includes an examining time, an instance time, and a running time. The examining time indicates a cost in time by the control node 120 examining the status of the system 100 before migrating the VM. A range of the examining time may be about 1 min-5 min. For instance, the examining time may be about 2 minutes. The instance time indicates a cost in time by the control node 120 invoking the instance before migrating the VM. The instance time is relative to a quantity of instances and a time slot of invoking the instance, a range of the time slot of invoking the instance is about 1 s-5 s. For instance, time slot of invoking the instance may be 5 seconds, meaning that an instance is invoked every 5 seconds. The running time indicates a cost in time by migrating the VM. A range of the running time may be about 30 s-120 s. For instance, the running time may be about 60 seconds.

For instance, before migrating the VM, the examining time $t1=120$ s, the time slot of invoking the instance $t0=5$ s, the quantity of the instances $n=30$, and the running time $t2=60$ s, the monitor node 110 may calculate the migrating time of the VM as $T=t1+t0*n+t2=330$ s.

In at least one embodiment, the monitor node 110 may store a migrating record of the VM migration. For instance, the monitor node 110 may write full or partial data of the VM migration into an evacuation_computeXX.log file, so as to provide effective and enduring reference to the operators for improving the system performance.

In at least one embodiment, the system 100 exchanges information with and among the monitor node 110, the control node 120, and the compute node 130, so as to monitor and control the VM migration. When the monitor data meets a trigger condition, the system 100 automatically starts the VM migration, automatically migrates the VM away from the abnormal node, recovers connection, and solves exceptional situation during migration of the VM, so as to decrease a downtime of the system and improve an efficiency of VM migration and an efficiency of operation and maintenance. After migrating the VM, the operator may check the migrating record of the system 100 at any time, so as to evaluate effectiveness and a reliability of the system 100.

Figure 2:
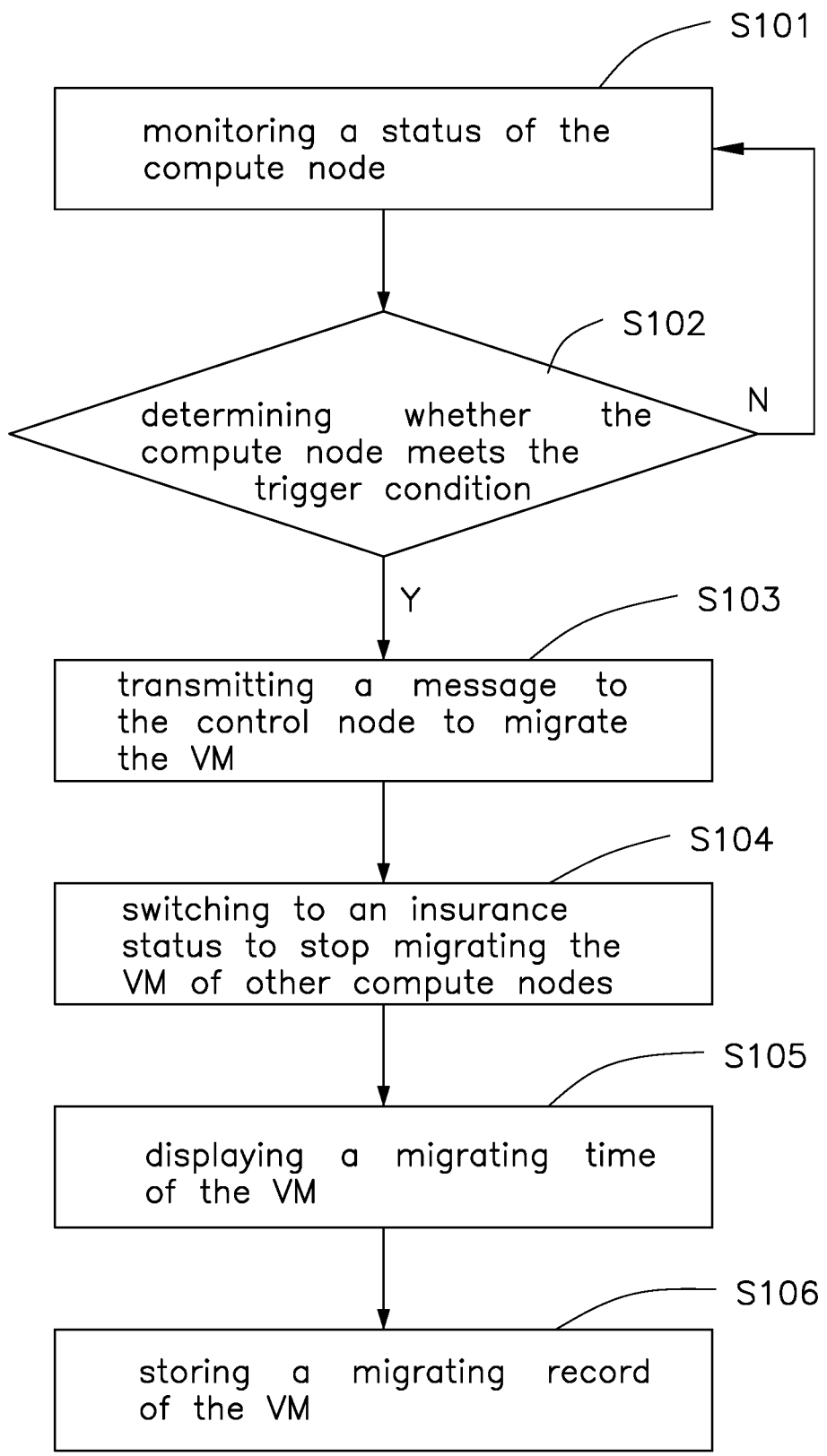
FIG. 2 is a flowchart of at least one embodiment of a method for migrating virtual machine according to the present disclosure.

FIG. 2 illustrates a flowchart of at least one embodiment of a method for migrating virtual machine. The functions may be integrated in the apparatus for the method for migrating virtual machine. In another embodiment, the method for migrating virtual machine can be run in a form of software development kit in an apparatus. The method may be applied in the monitor node 110 of the system 100.

The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S101.

At block S101, the monitor node 110 monitors a status of the compute node 130.

The status of the compute node 130 includes a normal status and an abnormal status. The abnormal status includes a lost connection or downtime of the compute node 130. When the compute node 130 malfunctions, such as lost connection or downtime, the monitor node 110 captures the incident and determines whether the compute node 130 meets a trigger condition.

In at least one embodiment, the operator may elect one or more monitor node 110 to monitor the status of the compute node 130.

At block S102, the monitor node 110 determines whether the compute node 130 meets the trigger condition. If the compute node 130 meets the trigger condition is determined, the procedure goes to block S103. If the compute node 130 does not meet the trigger condition is determined, the procedure goes back to block S101.

In at least one embodiment, the trigger condition includes a time period of lost connection of the compute node 130 reaches a predetermined time period, or an unstable status of the compute node 130. The predetermined time period may be in a range of about 1 min-5 min.

The lost connection of the compute node 130 includes four conditions: a lost connection of nova-compute agency services, a quantity of the nova-compute agency services in lost connection status is 1, a lost connection of a 10G network, and a lost connection of a 1G network. When meeting the four conditions, the compute node 130 is lost connection may be determined.

The unstable status of the compute node 130 includes four conditions: a lost connection of the nova-compute agency services, a quantity of the nova-compute agency services in lost connection status is 1, a lost connection of the 10G networks, and a quantity of the 10G networks in lost connection status is 1. When the quantity of the nova-compute agency services in lost connection status is 1, a frequency of the lost connection of the nova-compute agency services reaches a first determined frequency, the quantity of the 10G networks in lost connection status is 1, and a frequency of the lost connection of the 10G networks reaches a second determined frequency, the unstable status of the compute node 130 is determined. The first determined frequency may be in a range of about 8/10 min-14/10 min. The second determined frequency may be in a range of about 4/10 min-7/10 min.

When the compute node 130 meets the trigger condition, the monitor node 110 transmits a message to the control node 120 to migrate the VM of the abnormal compute node 130 to other unoccupied compute nodes 130.

At block S103, the monitor node 110 transmits a message to the control node 120 to migrate the VM.

In at least one embodiment, when the monitor node 110 determines that several compute nodes 130 are abnormal, orderly migrates the VMs of the compute nodes 130 which are abnormal, to decrease a situation of migrating the VM form one abnormal compute node 130 to another abnormal compute node 130.

In at least one embodiment, when the monitor node 110 transmits the message to the control node 120, the monitor node 110 examines a thread flag and a status lock of the control node 120, to decrease a situation of thread re-entry.

At block S104, the monitor node 110 switches to an insurance status to stop migrating the VM of other compute nodes 130.

When the control node 120 starts to migrate one of the VM of the abnormal compute nodes 130, the monitor node 110 switches to the insurance status to stop migrating the VMs of other abnormal compute nodes 130. After finishing the migration of one of the VMs of the abnormal compute nodes 130 is determined, the monitor node 110 switches to the working status to continuously monitoring the status of the compute nodes 130.

At block S105, the monitor node 110 displays a migrating time of the VM through a display.

The migrating time of the VM includes an examining time, an instance time, and a running time. A range of the examining time may be about 1 min-5 min. The instance time is relative to a quantity of the instances and a time slot of invoking the instance, a range of the time slot of invoking the instance is about is 1 s-5 s. A range of the running time may be about 30 s-120 s. The monitor node 110 calculates and displays the migrating time of the VM, the operator may set a start time of other threads according to the migrating time of the VM, so as to improve a running efficiency of the system.

At block S106, the monitor node 110 stores a migrating record of the VM.

In at least one embodiment, the monitor node 110 may write fully or partially data of the VM migration into a evacuation_computeXX.log file, so as to provide effective data reference to the operators for improving the system performance.

Figure 3:
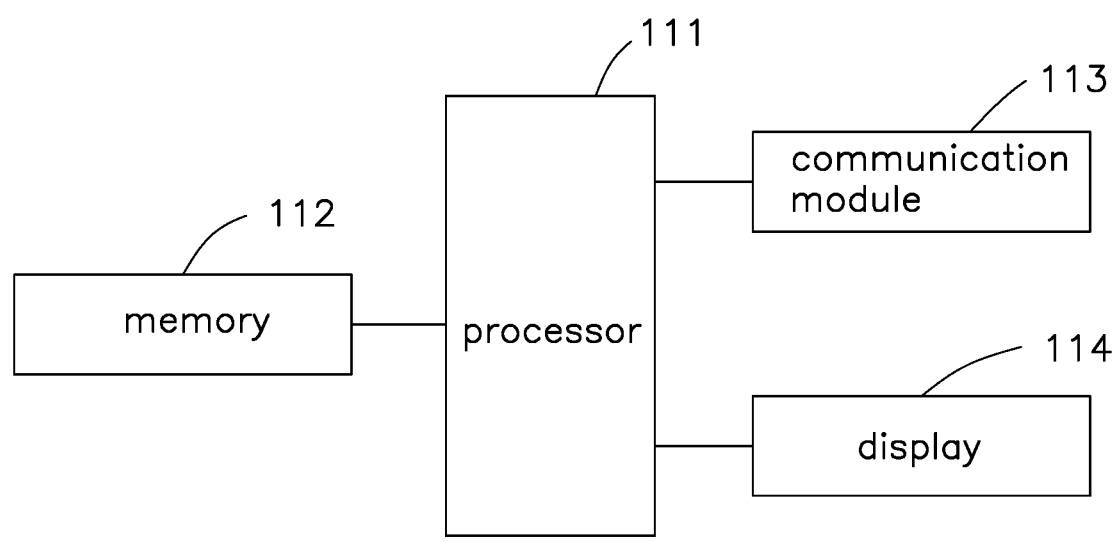
FIG. 3 illustrates a schematic view of at least one embodiment of a monitor node according to the present disclosure.

FIG. 3 illustrates a schematic view of at least one embodiment of the monitor node 110. The monitor node 110 includes at least one processor 111, a memory 112, a communication module 113, and a display 114. There are computer program which can be stored in the memory 112 and processed by the at least one processor 111, to perform the method for migrating virtual machine. The at least one processor 111 may be electrically connected to the memory 112, the communication module 113, and the display 114.

In at least one embodiment, the at least one processor 111 can be a central processing unit (CPU), a microprocessor, a digital signal processor (DSP), an application specific integrated circuit (ASIC), a field-programmable gate array (FPGA), a data processor chip, a programmable logic device (PLD), a discrete gate/transistor logic device, or a discrete hardware component. The at least one processor 111 may be electrically connected to other elements of the monitor node 110 through interfaces or a bus. In at least one embodiment, the monitor node 110 may further include a plurality of interfaces configured to communicate with other devices or apparatus.

In at least one embodiment, the memory 112 can include various types of non-transitory computer-readable storage mediums. The memory 112 can rapidly and automatically access instructions and data when the monitor node 110 is running. For example, the memory 112 can be an internal storage system, such as a flash memory, a Random Access Memory (RAM) for the temporary storage of information, and/or a Read-Only Memory (ROM), a Programmable Read-Only Memory (PROM), Erasable Programmable Read-Only Memory (EPROM), a One-time Programmable Read-Only Memory (OTPROM), Electrically-Erasable Programmable Read-Only Memory (EEPROM), Compact Disc Read-Only Memory (CD-ROM) for permanent storage of information. The memory 112 can also be an external storage system, such as a hard disk, a storage card, or a data storage medium.

The communication module 113 may include a mobile communication module and a wireless communication module. The mobile communication module is configured to provide communication solution on the monitor node 110, such as wireless communication solutions of 2G/3G/4G/5G. The wireless communication module is configured to wirelessly communicate and exchange data with external apparatus and devices and provide communication solution on the monitor node 110, such as Wireless Local Area Networks (WLAN), Wireless Fidelity (WI-FI), BLUETOOTH, Global Navigation Satellite System (GNSS), Frequency Modulation (FM), ZIGBEE, Infrared (IR), and/or Near Field Communication (NFC).

The display 114 is configured to display images, videos, and/or graphical user interface (GUI). The display 114 includes a display panel. The display panel may use at least one of Liquid Crystal Display (LCD), Organic Light-Emitting Diode (OLED), Active-Matrix Organic Light Emitting Diode (AMOLED), Flex Light-Emitting Diode (FLED), Miniled, MicroLed, Micro-oLed, Quantum Dot Light Emitting Diodes (QLED), etc. In at least one embodiment, the monitor node 110 may include one or N display 114, N is a positive integer.

Figure 4:
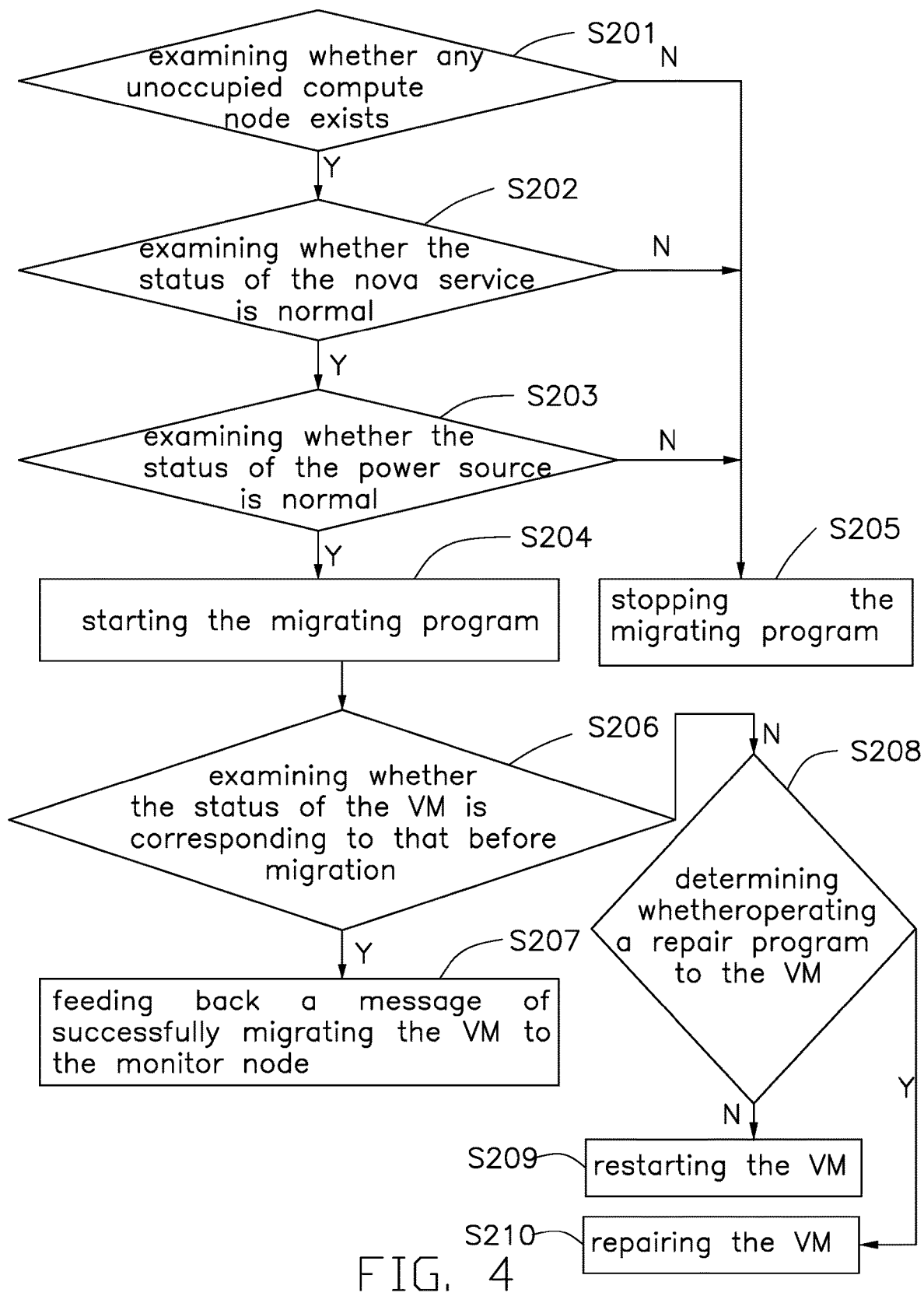
FIG. 4 is a flowchart of another embodiment of the method for migrating virtual machine according to the present disclosure.

FIG. 4 illustrates a flowchart of another embodiment of a method for migrating virtual machine. The functions may be integrated in the apparatus for the method for migrating virtual machine. In another embodiment, the method for migrating virtual machine can be run in a form of software development kit in an apparatus. The method may be applied in the control node 120 of the system 100.

The method is provided by way of example, as there are a variety of ways to carry out the method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block S201.

At block S201, the control node 120 examines whether any unoccupied compute node 130 exists. If unoccupied compute node 130 exists, the procedure goes to block S202. If no unoccupied compute node 130 exists, the procedure goes to block S205.

In at least one embodiment, the system 100 divides a storage area of the compute nodes 130 into an unoccupied area and a working area according to the working status of the compute nodes 130. When no compute node 130 exists in the unoccupied area, meaning there is no unoccupied compute node 130, the control node 120 feeds back a status message of the compute node 130 to the monitor node 110 to stop the migrating program. When compute node 130 exists in the unoccupied area, meaning there is unoccupied compute node 130, the control node 120 feeds back a status message of the compute node 130 to the monitor node 110 to start the migrating program.

At block S202, the control node 120 examines whether the status of the nova service is normal. If the status of the nova service is normal, the procedure goes to block S203. If the status of the nova service is abnormal, the procedure goes to block S205.

After the control node 120 determining the unoccupied compute node 130, a migrating path from a source host to a target host may be established, and examines whether the status of the nova service of the system 100 is normal. The source host means the compute node 130 of the VM to be migrated. The target host means the compute node 130 receiving the VM.

When the nova service is in the normal status, the control node 120 feeds back the status of the nova service to the monitor node 110 to start the migrating program. When the nova service is in the abnormal status, the control node 120 feeds back the status of the nova service to the monitor node 110 to stop the migrating program.

At block S203, the control node 120 examines whether the status of the power source is normal. If the status of the power source is normal, the procedure goes to block S204. If the status of the power source is abnormal, the procedure goes to block S205.

In at least one embodiment, the control node 120 may examine the status of the power source of the system 100 through the BMC. The status of the power source includes power-on, power-off, or standby. When the power source in the power-on status, the control node 120 feeds back the status of the power source to the monitor node 110 to start the migrating program. When the power source in the power-off status or the standby status, the system 100 lost connection, the monitor node 110 may not receive the feedback message from the control node 120.

At block S204, the control node 120 starts the migrating program.

When the control node 120 migrates the VM, examines the status of the system 100, including the blocks S201-S203. When the status of the system 100 is normal, the control node 120 starts the migrating program.

At block S205, the control node 120 stops the migrating program.

When the status of the system 100 is abnormal, the control node 120 stops the migrating program.

At block S206, the control node 120 examines whether the status of the VM is corresponding to that before migration. If the status of the VM is corresponding to that before migration, the procedure goes to block S207. If the status of the VM is not corresponding to that before migration, the procedure goes to block S208.

The control node 120 may record the status of the VM of the compute node 130 in real time. The status of the VM includes an active status or an error status.

In at least one embodiment, after VM migration, the control node 120 examines whether the status of the VM is corresponding to that before migration.

At block S207, the control node 120 feeds back a message of successfully migrating the VM to the monitor node 110.

If the status of the VM is corresponding to that before migration, the control node 120 feeds back the message of successfully migrating the VM to the monitor node 110.

At block S208, the control node 120 determines whether operating a repair program to the VM. If no repair program is needed, the procedure goes to block S209. If the repair program is needed, the procedure goes to block S210.

If the status of the VM is not corresponding to that before migration, the control node 120 determines whether operating a repair program to the VM.

When the status of the VM is not corresponding to that before migration, two situations may exist: first, the VM is down in a time period, and if after the time period or restarting the VM, the status of the VM may be automatically recovered to the status before migration; second, the VM is abnormal, if it is without repaired, the status of the VM may not be recovered to the status before migration.

At block S209, the control node 120 restarts the VM.

When the first situation exists, no repair program is needed, restarting the VM or waiting for the VM to automatically recover. The control node 120 may run a restart program to restart the VM.

In at least one embodiment, after restarting the VM, the status of the VM is not recovered, the control node 120 feeds back the message of migrating failure of the VM to the monitor node 110, and the procedure goes to block S210.

At block S210, the control node 120 repairs the VM.

When the second situation exists, repair program is needed to repair the abnormal VM.

Figure 5:
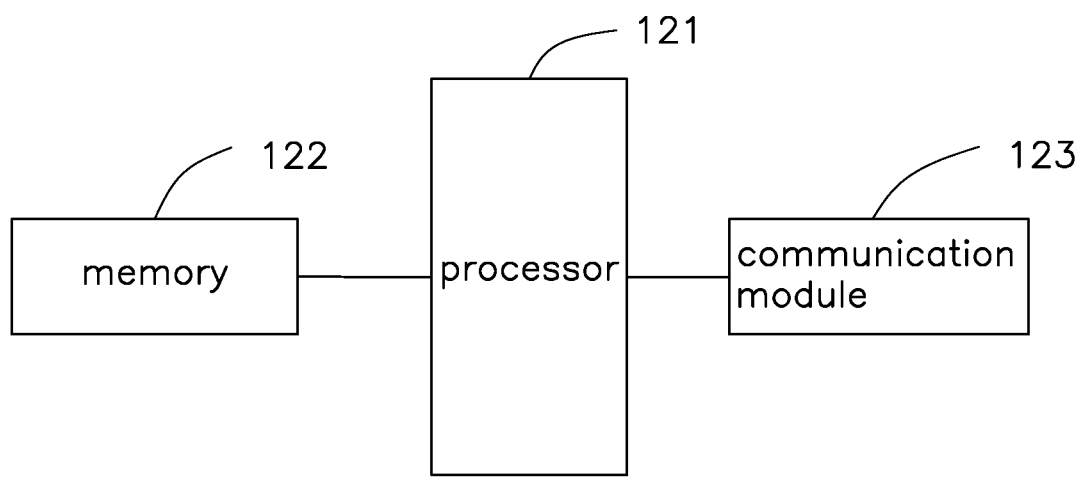
FIG. 5 illustrates a schematic view of at least one embodiment of a control node according to the present disclosure.

FIG. 5 illustrates a schematic view of at least one embodiment of the control node 120.

The control node 120 includes at least one processor 121, a memory 122, and a communication module 123. There are computer program which can be stored in the memory 122 and processed by the at least one processor 121, to perform the method for migrating virtual machine.

The at least one processor 121 includes a Baseboard Management Controller (BMC) and a general processor. The control node 120 may examine the status of the power source through the BMC. The general processor may be similar to the at least one processor 111 as described before. The memory 122 may be similar to the memory 112 as described before. The communication module 123 may be similar to the communication module 113 as described before.

A non-transitory computer-readable storage medium including program instructions for causing the apparatus to perform the method for migrating virtual machine is also disclosed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. A method of migrating virtual machine (VM) comprising:
    monitoring a status of at least one compute node;
    determining whether the at least one compute node meets a trigger condition; wherein the trigger condition comprising a time period of lost connection of the at least one compute node reaching a predetermined time period, or an unstable status of the at least one compute node; and
    if the at least one compute node meets the trigger condition, transmitting a message to a control node to migrate the VM;
    wherein if there are multiple compute nodes determined to meet the trigger condition, the method further comprises:
    when starting to migrate the VM of one of the multiple compute nodes, switching to an insurance status to stop migrating the VM of other compute nodes of the multiple compute nodes; and
    after finishing the migration of the VM of the compute node, switching to a working status to continuously monitoring the status of the at least one compute node.

2. The method according to claim 1, wherein the lost connection of the at least one compute node comprises:
    a lost connection of a 10G network, and a lost connection of a 1G network.

3. The method according to claim 1, wherein the unstable status of the at least one compute node comprises:
    a lost connection of 10G networks, and a quantity of the 10G networks in lost connection status is 1.

4. The method according to claim 3, wherein when the quantity of the 10G networks in lost connection status is 1, and a frequency of the lost connection of the 10G networks reaches a second determined frequency, the unstable status of the compute node is determined.

5. The method according to claim 1, further comprising:
    calculating and displaying a migrating time of the VM.

6. The method according to claim 1, further comprising:
    storing a migrating record of the VM.

7. A method of migrating virtual machine (VM) comprising:
    examining a status of a system for managing a cloud platform;
    feeding back a message of migrating the VM to a monitor node;
    examining whether a status of the VM is corresponding to the status before migration; and
    if the status of the VM is not corresponding to the status before migration, repairing the VM;
    wherein the examining the status of the system for managing the cloud platform comprises:
    examining whether any unoccupied compute node exists; and
    examining whether a status of a power source of the system is normal.

8. The method according to claim 7, further comprising:
    if unoccupied compute node exists, and if the status of the power source is normal, starting a migrating program to migrate the VM.

9. The method according to claim 8, further comprising:
    if no unoccupied compute node exists, or if the status of the power source is abnormal, stopping the migrating program to stop migrating the VM.

10. The method according to claim 7, further comprising:
    if the status of the VM is corresponding to the status before migration, feeding back a message of successfully migrating the VM to the monitor node.

11. An apparatus for migrating virtual machine (VM) comprising:
    a communication module;
    at least one processor;
    a memory coupled to the at least one processor and storing program instructions, the memory and the program instructions are configured to, with the at least one processor, cause the apparatus to perform:
    monitoring a status of a compute node;
    determining whether the compute node meets a trigger condition; wherein the trigger condition comprising a time period of lost connection of the compute node reaching a predetermined time period, or an unstable status of the compute node; and
    if the compute node meets the trigger condition, transmitting a message to a control node to migrate the VM;

wherein when there are several compute nodes meet the trigger condition, the memory and the program instructions configured to, with the at least one processor, cause the apparatus further to perform:

when starting to migrate the VM of one of the compute nodes, switching to an insurance status to stop migrating the VM of other compute nodes; and after finishing the migration of the VM of one of the compute nodes, switching to a working status to continuously monitoring the status of the compute nodes.

12. The apparatus according to claim 11, wherein the lost connection of the compute node comprises:

a lost connection of a 10G network, and a lost connection of a 1G network.

13. The apparatus according to claim 11, wherein the unstable status of the compute node comprises:

a lost connection of 10G networks, and a quantity of the 10G networks in lost connection status is 1.

14. The apparatus according to claim 13, wherein when the quantity of the 10G networks in lost connection status is 1, and a frequency of the lost connection of the 10G networks reaches a second determined frequency, the unstable status of the compute node is determined.

15. The apparatus according to claim 11, further comprising a display, wherein the memory and the program instructions configured to, with the at least one processor, cause the apparatus further to perform:

calculating and displaying a migrating time of the VM; and storing a migrating record of the VM.

16. The apparatus according to claim 11, wherein the memory and the program instructions configured to, with the at least one processor, cause the apparatus further to perform:

examining a status of a system for managing a cloud platform;

feeding back a message of migrating the VM to a monitor node;

examining whether a status of the VM is corresponding to the status before migration; and if the status of the VM is not corresponding to the status before migration, repairing the VM.

17. The apparatus according to claim 16, wherein the examining the status of the system for managing the cloud platform comprises:

examining whether any unoccupied compute node exists; and examining whether a status of a power source of the system is normal.

* * * * *